US 12,362,891 B2
(45) Date of Patent: *Jul. 15, 2025

(12) United States Patent
Zhang et al.

(10) Patent No.: US 12,362,891 B2

(54) METHOD FOR SIGNAL COMMUNICATION, COMMUNICATION NODE, AND STORAGE MEDIUM

(71) Applicant: ZTE CORPORATION, Shenzhen (CN)

(72) Inventors: Shujuan Zhang, Shenzhen (CN); Zhaohua Lu, Shenzhen (CN); YuNgok Li, Shenzhen (CN); Bo Gao, Shenzhen (CN); Chuangxin Jiang, Shenzhen (CN); Yijian Chen, Shenzhen (CN); Huahua Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,730

(22) Filed: Mar. 28, 2024

(65) Prior Publication Data
US 2024/0243889 A1 Jul. 18, 2024

Related U.S. Application Data

(63) Continuation of application No. 17/290,888, filed as application No. PCT/CN2019/115080 on Nov. 1, 2019, now Pat. No. 11,991,120.

(30) Foreign Application Priority Data

Nov. 2, 2018 (CN) .......................... 201811303667.3

(51) Int. Cl.
*H04L 5/00* (2006.01)
*H04B 17/309* (2015.01)
*H04L 27/26* (2006.01)

(52) U.S. Cl.
CPC ......... *H04L 5/0091* (2013.01); *H04B 17/309* (2015.01); *H04L 5/0023* (2013.01);
(Continued)

(58) Field of Classification Search
None
See application file for complete search history.

(56) References Cited

U.S. PATENT DOCUMENTS 10,904,872 B2 * 1/2021 Ren .......................... H04B 7/024
10,952,231 B2 * 3/2021 Liou ..................... H04W 76/27
(Continued)

FOREIGN PATENT DOCUMENTS

| CN | 107771378 A | 3/2018 |
|---|---|---|
| CN | 108199819 A | 6/2018 |

(Continued)

OTHER PUBLICATIONS

Chinese Search Report for Application No. 201811303667.3, dated Apr. 11, 2022, 5 pages including translation.

(Continued)

*Primary Examiner* — Phirin Sam
(74) *Attorney, Agent, or Firm* — Morgan, Lewis & Bockius LLP

(57) ABSTRACT

Provided a method for signal communication includes: determining first information according to signaling information and a predetermined rule; determining, according to the first information, a quasi co-location reference signal set of a port group comprised in a signal; and communicating the signal according to the determined quasi co-location reference signal set of the port group comprised in the signal, where the communicating comprises receiving or transmitting. The first information comprises: a time interval between the signal and a control channel for scheduling the signal, a number of quasi co-location reference signal sets of (Continued)

First information is determined according to signaling information and/or a predetermined rule — S101

A quasi co-location reference signal set of a port group included in a data channel and/or a data signal is determined according to the first information — S102 a control channel element, a number of quasi co-location reference signal sets of the signal, and an index of the quasi co-location reference signal sets of the control channel element; and the time interval between the signal and the control channel for scheduling the signal is less than a predetermined threshold.

20 Claims, 3 Drawing Sheets

(52) U.S. Cl.
CPC .......... *H04L 5/0048* (2013.01); *H04L 5/0053* (2013.01); *H04L 5/0082* (2013.01); *H04L 27/261* (2013.01)

(56) References Cited

U.S. PATENT DOCUMENTS

| | | | | |
|---|---|---|---|---|
| 11,617,195 | B2* | 3/2023 | Huang | H04L 5/0053 370/329 |
| 11,770,806 | B2* | 9/2023 | Lee | H04L 5/0048 370/329 |
| 2018/0175983 | A1 | 6/2018 | Yum et al. | |
| 2019/0115955 | A1 | 4/2019 | Wilson et al. | |
| 2019/0230646 | A1 | 7/2019 | Li et al. | |
| 2020/0014515 | A1 | 1/2020 | Qin et al. | |
| 2020/0374717 | A1* | 11/2020 | He | H04W 56/0015 |
| 2021/0135821 | A1* | 5/2021 | Guan | H04L 5/0048 |
| 2021/0211988 | A1 | 7/2021 | Jung et al. | |
| 2021/0243635 | A1* | 8/2021 | Yan | G01S 5/0036 |
| 2021/0258056 | A1 | 8/2021 | Davydov et al. | |
| 2022/0052824 | A1* | 2/2022 | Kim | H04L 5/0094 |
| 2022/0116177 | A1* | 4/2022 | Shi | H04L 5/0053 |
| 2022/0239364 | A1 | 7/2022 | Chen et al. | |
| 2023/0089191 | A1 | 3/2023 | Davydov et al. | |
| 2024/0187196 | A1* | 6/2024 | Kim | H04L 1/1819 |
| 2024/0291608 | A1* | 8/2024 | Jiang | H04W 52/04 |

FOREIGN PATENT DOCUMENTS

| | | |
|---|---|---|
| CN | 108206714 A | 6/2018 |
| CN | 108633061 A | 10/2018 |

OTHER PUBLICATIONS

Ericsson, "Summary of views on beam measurement and reporting—v3", 3GPP Draft, R1-1811996, Summary of Views On Beam Measurement and REPORTING-V3, 3rd Generation Partnership Project (3GPP), Mobile Competence Centre; 650, Route Des Lucioles; F-06921 Sophia-Antipolis C, vol. RAN WGI, No. Chengdu, China; Oct. 8, 2018-Oct. 12, 2018 Oct. 11, 2018 (Oct. 11, 2018), XP051519319, Retrieved from the Internet: URL:http://www.3gpp.org/ftp/tsg%5Fran/WG1%5FRL1/TSGR1%5F94b/Docs/R1%2DI811996%2Ezip [retrieved on Oct. 11, 2018] * section 2 *.
Extended European Search Report for Application No. 19878968.7, dated Jun. 27, 2022, 8 pages.
Huawei et al.: "Maintenance for beam management", 3GPP Draft; R1-1810100, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018 Sep. 29, 2018 (Sep. 29, 2018), XP051517515, Retrieved from the Internet: URL:http://www.3gpp.org/ftp/tsg%5Fran/WG1%5FRL1/TSGR1%5F94b/Docs/R1%2DI810100%2Ezip [retrieved on Sep. 29, 2018] * sections 2, 3 *.
Qualcomm Incorporated, "Beam management for NR", 3GPP TSG-RAN WG1 Meeting #94 R1-1809711, Gothenburg, Sweden, Aug. 20-24, 2018, 16 pages.
ZTE, "Maintenance for beam management", 3GPP TSG RAN WG1 Meeting #94bis R1-1810214, Chengdu, China, Oct. 8-12, 2018, 11 pages.
International Search Report for Application No. PCT/CN2019/115080, dated Jan. 31, 2020, 4 pages including English translation.
Nokia et al., "R1-1801054, Summary of QCL", *3GPP TSG RAN WG1 Meeting AH* 1801, Jan. 26, 2018 (Jan. 6, 2018), see entire document.
ZTE et al., "R1-1719538, Details and evaluation results on beam indication", 3GPP TSG RAN WG1 Meeting #91, Dec. 1, 2017 (Dec. 1, 2017), see section 2.

* cited by examiner

METHOD FOR SIGNAL COMMUNICATION, COMMUNICATION NODE, AND STORAGE MEDIUM

CROSS-REFERENCES TO RELATED APPLICATION(S)

This is a Continuation Application of U.S. patent application Ser. No. 17/290,888, filed Nov. 9, 2021, now U.S. Pat. No. 11,991,120, which is a U.S. National Stage Application of International Patent Application No. PCT/CN2019/115080, filed Nov. 1, 2019, which claims priority to Chinese Patent Application No. 201811303667.3 filed Nov. 2, 2018, the disclosures of which are incorporated herein by reference in their entireties.

TECHNICAL FIELD

The present disclosure relates to, but is not limited to, the field of communication technologies.

BACKGROUND

In the 5th generation mobile networks (5G) new radio (NR) technology, when radio frequency beams are used, beams of the physical downlink shared channel (PDSCH)/aperiodic-channel state information-reference signal (AP-CSI-RS) can be dynamically notified through downlink control information (DCI). However, since when the PDSCH/AP-CSI-RS is buffered, the DCI has not been successfully decoded, or even if the DCI has been successfully decoded, the terminal does not have time to transmit the beam indicated in the DCI, it is necessary to consider a default beam of PDSCH/AP-CSI-RS when a time interval between DCI and AP-CSI-RS is less than a predetermined value.

In the 5G, a beam with a lowest CORESET in a slot closest to the PDSCH/AP-CSI-RS and in a slot (time slot) set is used as a beam of the PDSCH/AP-CSI-RS, in which, the slot set includes a control channel resource set (CORESET).

Since one bandwidth part (BWP) may be configured with up to three CORESETs, the default beam of the PDSCH/AP-CSI-RS is relatively limited. On one hand, there is only one default beam for the PDSCH/AP-CSI-RS in one slot with less flexibility, hence how to improve the flexibility of the default beam of the PDSCH/AP-CSI-RS becomes a main problem that needs to be solved urgently. On the other hand, when multiple transmission reference points (TRPs) are used for transmission and a number of beams of the physical downlink control channel (PDCCH) is not equal to a number of beams of the PDSCH, how to determine the default beam of the PDSCH/AP-CSI-RS is also a problem that needs to be solved urgently.

SUMMARY

Embodiments of the present disclosure provides a method for signal communication including: determining first information according to signaling information and a predetermined rule; determining, according to the first information, a quasi co-location reference signal set of a port group comprised in a signal; and communicating the signal according to the determined quasi co-location reference signal set of the port group comprised in the signal, where the communicating comprises receiving or transmitting. The first information comprises: a time interval between the signal and a control channel for scheduling the signal, a number of quasi co-location reference signal sets of a control channel element, a number of quasi co-location reference signal sets of the signal, and an index of the quasi co-location reference signal sets of the control channel element; and the time interval between the signal and the control channel for scheduling the signal is less than a predetermined threshold.

Embodiments of the present disclosure provides a communication node including: a processor, a memory, and a communication bus. the communication bus is configured to implement connections and communications between the processor and the memory; and the processor is configured to execute one or more computer programs stored in the memory to perform: determining first information according to signaling information and a predetermined rule; determining, according to the first information, a quasi co-location reference signal set of a port group comprised in a signal; and communicating the signal according to the determined quasi co-location reference signal set of the port group comprised in the signal, where the communicating comprises receiving or transmitting. The first information comprises: a time interval between the signal and a control channel for scheduling the signal, a number of quasi co-location reference signal sets of a control channel element, a number of quasi co-location reference signal sets of the signal, and an index of the quasi co-location reference signal sets of the control channel element; and the time interval between the signal and the control channel for scheduling the signal is less than a predetermined threshold.

Embodiments of the present disclosure provides a non-transitory computer-readable storage medium, including instructions. The instructions, when executed by a processor, is configured for performing: determining first information according to signaling information and a predetermined rule; determining, according to the first information, a quasi co-location reference signal set of a port group comprised in a signal; and communicating the signal according to the determined quasi co-location reference signal set of the port group comprised in the signal, where the communicating comprises receiving or transmitting. The first information comprises: a time interval between the signal and a control channel for scheduling the signal, a number of quasi co-location reference signal sets of a control channel element, a number of quasi co-location reference signal sets of the signal, and an index of the quasi co-location reference signal sets of the control channel element; and the time interval between the signal and the control channel for scheduling the signal is less than a predetermined threshold.

DETAILED DESCRIPTION

In order for the object, solution and advantages of the present disclosure to be more apparent, embodiments of the present disclosure are further described below in detail in conjunction with implementations and drawings. It is to be understood that the embodiments described herein are merely intended to explain the present disclosure and not to limit the present disclosure.

In embodiments of the present disclosure, a quasi co-location reference signal set of a PDSCH is a quasi co-location reference signal set of a demodulation reference signal (DMRS) of the PDSCH. A port group may also be referred to as a quasi co-location port group. The port group satisfies one or more of the following characteristics: any two ports in a same port group satisfy a quasi co-location relationship with respect to quasi co-location parameters of a type, ports in different port groups do not satisfy the quasi co-location relationship with respect to quasi co-location parameters of the same type, each port group corresponds to one or more quasi co-location reference signal sets, or one port group is associated with one or more quasi co-location reference signal sets on one time-frequency resource. One quasi co-location reference signal set includes one or more reference signals, each reference signal is associated with one or more quasi co-location parameters, a number of reference signals associated with one quasi co-location parameter in a quasi co-location reference signal set is not allowed to be greater than 1, and a number of reference signals associated with one quasi co-location parameter in a plurality of quasi co-location reference signal sets is allowed to be greater than 1.

In embodiments of the present disclosure, one control channel element is one of the following: one CORESET, one search space set, one search space, one candidate control channel, or one control channel quasi co-location resource group.

In embodiments of the present disclosure, the control channel element that satisfies a second predetermined characteristic is at least one of the following: control channel elements of the L-th lowest to the (L+M)-th lowest in a control channel element set satisfying a first predetermined characteristic in the first time unit.

In embodiments of the present disclosure, an association existing between two elements indicates at least one of the following: a parameter value of another element may be obtained according to a parameter value of one element; according to a parameter value of one element, a value range of a parameter value of another element may be obtained; two elements are not allowed to have a same setting value combination at a same time; or an activated parameter value of one element is another element.

In embodiments of the present disclosure, one frequency domain bandwidth is one BWP or one component carrier (CC).

Figure 1:
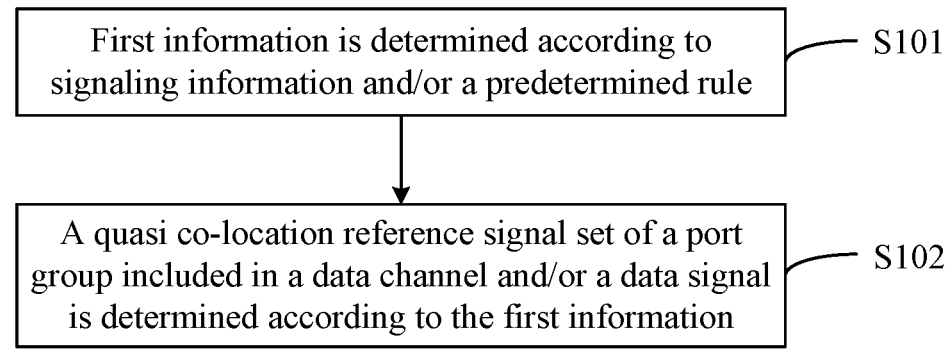
FIG. 1 is a flowchart of a method for determining a quasi co-location reference signal set according to an embodiment of the present disclosure.

Embodiments of the present disclosure provide a method for determining a quasi co-location reference signal set. As shown in FIG. 1, the method may include steps S101 to S102.

In step S101, first information is determined according to signaling information and/or a predetermined rule.

According to embodiments of the present disclosure, the first information includes at least one of the following: unit granularities of first time units, information on a number of the first time units included between a control channel and a data channel and/or a signal, unit index information of a second time unit at which the data channel and/or the signal is located, a number of reference signal elements of a control channel element, a number of reference signal elements of the data channel and/or the signal, an index of the reference signal elements of the control channel element, an index of the reference signal elements of the data channel and/or the signal, a second-type quasi co-location reference signal set configured in the control channel element, or a number of time domain symbols included in one time slot. One reference signal element is at least one of the following: one quasi co-location reference signal set or one port group.

In step S102, a quasi co-location reference signal set of the port group included in the data channel and/or the signal is determined according to the first information.

According to embodiments of the present disclosure, a number of the reference signal elements of the control channel/data channel/signal may also be referred to as a number of reference signal elements corresponding to the control channel/data channel/signal, or be referred to as a number of the reference signal elements included in the control channel/data channel/signal.

According to embodiments of the present disclosure, the port group is at least one of the following port groups: a port group of demodulation reference signal, a port group of measurement reference signal, a port group of phase tracking reference signal, or a port group of synchronization signal.

According to embodiments of the present disclosure, one reference signal element includes at least one of the following: one quasi co-location reference signal set or one port group.

According to embodiments of the present disclosure, the unit granularities of the first time units include one of x time domain symbols or y time slots, where y is an positive integer greater than or equal to 1; and x satisfies at least one of the following characteristics: a number of time domain symbols included in m time slots is an integer multiple of x, and m is a positive integer greater than or equal to 1; x is less than or equal to the number of the time domain symbols included in one time slot; or m time slots include more than one granularity of the first time units, and a number x of time domain symbols included in different granularities of the first time units is inconsistent.

According to embodiments of the present disclosure, the unit granularities of the first time units satisfy at least one of the following characteristics: the unit granularities of the first time units are associated with the unit index information of the second time unit at which the data channel and/or the signal is located; the unit granularities of the first time units are associated with the index and/or number of the reference signal elements of the data channel and/or the signal; the unit granularities of the first time units are associated with a scrambling sequence parameter RNTI type of a control channel for scheduling the data channel and/or the signal; each port group of the data channel and/or the signal corresponds to a respective one of the unit granularities of the first time units; unit granularities of first time units each of which corresponds to a respective one of two port groups of the data channel and/or the signal are different; a time domain resource included in one of the first time units does not belong to more than one time slot; or one of the first time units includes consecutive time domain symbols.

According to embodiments of the present disclosure, the determined power information may include at least one of the following: acquiring a quasi co-location reference signal set corresponding to an port group of the data channel and/or the signal, according to one or more quasi co-location reference signal sets of a control channel element satisfying a second predetermined characteristic in a first time unit in a first time unit set, where the first time unit in the first time unit set is closest to the data channel and/or the signal, and the first time unit set includes a control channel element satisfying a first predetermined characteristic, wherein the control channel element satisfying the second predetermined characteristic is a control channel element with the lowest index among the control channel elements satisfying the second predetermined characteristic in the first time unit; or acquiring a quasi co-location reference signal set corresponding to an port group of the data channel and/or the signal, according to a second-type quasi co-location reference signal set configured in a control channel element satisfying a second predetermined characteristic in a first time unit in a first time unit set, where the first time unit in the first time unit set is closest to the data channel and/or the signal, and the first time unit set includes a control channel element satisfying the first predetermined characteristic.

According to embodiments of the present disclosure, the control channel element satisfying the first predetermined characteristic includes at least one of the following: the control channel element belonging to a control channel element group that corresponds to the data channel and/or the signal; the control channel element locating at a frequency domain bandwidth index that corresponds to a frequency domain bandwidth index at which the data channel and/or the signal is located; the control channel element in a predetermined frequency domain bandwidth included in the first time unit, wherein a number of reference signal elements included in the control channel element and the number of the reference signal elements included in the data channel and/or the signal satisfy a predetermined condition; the control channel element, wherein the number of the reference signal elements included in the control channel element and the number of the reference signal elements included in the data channel and/or the signal satisfy a predetermined condition; the control channel element being configured with TCI; the control channel element corresponding to an quasi co-location reference signal set having an empty intersection with a synchronization signal; the control channel element corresponding to a frequency domain bandwidth being in an active state; or the control channel element corresponding to at least one activated transmission configuration indication information (TCI).

According to embodiments of the present disclosure, the predetermined condition includes one of the following: the number of the reference signal elements of the control channel element is equal to the number of the reference signal elements of the data channel and/or the signal; or the number of the reference signal elements of the control channel element is greater than or equal to the number of the reference signal elements of the data channel and/or the signal.

According to embodiments of the present disclosure, the quasi co-location reference signal set of the port group is determined according to one or more of the following information: information a of a number of the first time units included between the control channel and the data channel and/or the signal, information m of unit index of the second time unit where the data channel and/or the signal is located; and the determining the quasi co-location reference signal set of the port group, includes: determining the quasi co-location reference signals of the port group according to at least one of the following information: mod(a, A), where A is a predetermined value greater than or equal to 1; mod(n, N), wherein N is a predetermined value greater than or equal to 1; or, the second time unit includes integer multiples of the first time units.

According to embodiments of the present disclosure, the step of determining the quasi co-location reference signal set of the port group of the data channel and/or the signal according to a number d of the reference signal elements of the control channel and/or a number c of the reference signal elements of the data channel and/or the signal may include: in a case where a first condition is satisfied, determining a correspondence between the c reference signal elements of the data channel and/or the signal and the d reference signal elements of the control channel according to the signaling information and/or the predetermined rule, where the first condition includes at least one of the following: c is not equal to d, c is equal to d and greater than 1, d is greater than 1, or c is greater than 1.

According to embodiments of the present disclosure, the step of determining the correspondence between the c reference signal elements of the data channel and/or the signal and the d reference signal elements of the control channel according to the signaling information and/or the predetermined rule includes: determining {a $j_1$-th reference signal element, a $j_2$-th reference signal element, . . . , and a $j_e$-th reference signal element} of a control channel element corresponding to an i-th reference signal element of the data channel and/or the signal according to the signaling information and/or the predetermined rule, where e is a positive integer greater than or equal to 1, and/or e is a predetermined value, and $j_1 \in \{1, 2, \ldots d\}$, l=1, 2, . . . .e .

According to embodiments of the present disclosure, an i-th port group of the data channel and/or the signal corresponds to {a $j_1$-th port group, a $j_2$-th port group, . . . , and a $j_e$-th port group} of the control channel element, a quasi co-location reference signal set of the i-th port group includes a quasi co-location reference signal set list formed by {a quasi co-location reference signal set list of a $j_1$-th port group, a quasi co-location reference signal set list of a $j_2$-th port group, . . . , and a quasi co-location reference signal set list of a $j_e$-th port group}, where $j_l \in \{1, 2, \ldots d\}$, l=1, 2, . . . e; and/or a quasi co-location reference signal set of an i-th port group of the data channel and/or the signal includes {a $j_1$-th quasi co-location reference signal set, a $j_2$-th quasi co-location reference signal set, . . . , a $j_e$-th quasi co-location reference signal set} corresponding to the control channel element, where $j_l \in \{1, 2, \ldots d\}$, l=1, 2, . . . e; a quasi co-location reference signal set of an i-th port group includes a quasi co-location reference signal set list formed by {a $j_1$-th quasi co-location reference signal set, a $j_2$-th quasi co-location reference signal set, . . . , and a $j_e$-th quasi co-location reference signal set}; and/or a quasi co-location reference signal set of an i-th port group of the data channel and/or the signal includes {a $j_1$-th quasi co-location reference signal set, a $j_2$-th quasi co-location reference signal set, . . . and a $j_e$-th quasi co-location reference signal set} of the control channel element, where $j_1 \in \{1, 2, \ldots d\}$, l=1, 2, . . . e; {the $j_1$-th quasi co-location reference signal set, the $j_2$-th quasi co-location reference signal set, . . . , and the $j_e$-th quasi co-location reference signal set} corresponds to one port group q of the control channel element group, a quasi co-location reference signal set of the one port group q includes {a first quasi co-location reference signal set, a second quasi co-location reference signal set, . . . , and an E-th quasi co-location reference signal set}, and {the $j_1$-th quasi co-location reference signal set, the $j_2$-th quasi co-location reference signal set, . . . , and the $j_e$-th quasi co-location reference signal set} is a subset of {the first quasi co-location reference signal set, the second quasi co-location reference signal set, . . . , and the E-th quasi co-location reference signal set}.

According to embodiments of the present disclosure, a quasi co-location reference signal set of the control channel element includes a second-type quasi co-location reference signal set configured in the control channel element, and/or a first-type quasi co-location reference signal set of the control channel element.

According to embodiments of the present disclosure, the number of the quasi co-location reference signal sets included in one data channel and/or one data signal satisfies at least one of the following characteristics: one port group of one data channel and/or one data signal is associated with g quasi co-location reference signal sets on f quasi co-location resource groups, where f is a positive integer greater than or equal to 1, g is a positive integer greater than or equal to f, or the one port group is associated with one or more quasi co-location reference signals on one quasi co-location resource group, where the resource group is a time domain resource group and/or a frequency domain resource group, the f quasi co-location resource groups belong to one data channel and/or one data signal, the channel includes the data channel and/or the control channel element, and a quasi co-location reference signal set included in the port group includes the g quasi co-location reference signal sets.

According to embodiments of the present disclosure, f quasi co-location resource groups satisfy at least one of the following characteristics: division of resource groups included in one data channel and/or one data signal is determined according to the signaling information and/or the predetermined rule; or, an association between the number of the reference signal elements of one data channel and/or one data signal and the division of the resource groups included in the data channel and/or the signal exists.

According to embodiments of the present disclosure, the quasi co-location reference signal set included in the port group of the data channel and/or the signal is acquired according to the second-type quasi co-location reference signal set configured in the control channel element, and the second-type quasi co-location reference signal set satisfies at least one of the following characteristics: the second-type quasi co-location reference signal set being a quasi co-location reference signal set in the control channel element and configured for the data channel and/or the signal; one or more second-type quasi co-location reference signal sets configured in one control channel element; the second-type quasi co-location reference signal set not satisfying a quasi co-location relationship with a demodulation reference signal in the control channel element; the second-type quasi co-location reference signal set not having an association with a demodulation reference signal in the control channel element; or, the first-type quasi co-location reference signal configured in the control channel element satisfying a quasi co-location relationship with a demodulation reference signal in the control channel element.

According to embodiments of the present disclosure, the step of determining, according to the first information, the quasi co-location reference signal set of the port group included in the data channel and/or the signal may include: determining the quasi co-location reference signal set of the port group of the data channel and/or the signal according to the number of the reference signal elements of the data channel and/or the signal, where a number of reference signal elements of the data channel and/or the signal of a type in one first time is determined according to the signaling information and/or the predetermined rule, and a communication node expects the number of the reference elements of the data channel and/or the signal of the same type received in one first time unit not to exceed a predetermined value. Where, the data channel and/or the signal of different types are distinguished by at least one piece of the following information: an RNTI type of a control channel for scheduling the data channel and/or the signal, a frequency domain bandwidth at which the data channel and/or the signal is located, a relationship between a time interval being between a control channel for scheduling the data channel and/or the signal and the data channel and/or the signal and a predetermined threshold, or a number of a retransmission times of the data channel and/or the signal, where the number of the retransmission times may also be referred to as aggression of one channel.

According to embodiments of the present disclosure, the port group satisfies at least one of the following characteristics: ports in one port group satisfy a quasi co-location relationship with respect to quasi co-location parameters of a type; ports in different port groups do not satisfy a quasi co-location relationship with respect to the quasi co-location parameters of the same type; each port group corresponds to one or more quasi co-location reference signal sets; one port group is associated with one or more quasi co-location reference signal sets on one time-frequency resource; or the port group is at least one of the following port groups: a port group of demodulation reference signal, a port group of measurement reference signal, a port group of phase tracking reference signal, or a port group of synchronization signal.

According to embodiments of the present disclosure, the control channel element includes at least one of the following: one CORESET; one search space set, one search space, one candidate control channel, one control channel quasi co-location resource group, the control channel element including the control channel for scheduling the data channel and/or the signal, or, the control channel element including a control channel element satisfying the second predetermined characteristic and in the first time unit including the control channel element satisfying the first predetermined characteristic and closest to the data channel and/or the signal. The control channel quasi co-location resource group satisfies one or more of the following characteristics: control channels and/or control signals in one control channel quasi co-location resource group satisfies a quasi co-location relationship, one control channel quasi co-location resource group corresponds to one or more quasi co-location reference signal sets, or control channels and/or control signals in one control channel quasi co-location resource group do not satisfy the quasi co-location relationship.

According to embodiments of the present disclosure, one quasi co-location resource group satisfies at least one of the following characteristics: quasi co-location reference signal sets of channels and/or signals in one quasi co-location resource group are same; each quasi co-location resource group corresponds to one quasi co-location reference signal set; channels and/or signals in different quasi co-location resource groups do not satisfy a quasi co-location relationship with respect to quasi co-location parameters of a type; one demodulation reference signal port corresponds to one quasi co-location reference signal set in each quasi co-location resource group; one demodulation reference signal port in different quasi co-location resource groups does not satisfy the quasi co-location relationship with respect to quasi co-location parameters of a type; one first-type control channel element includes more than one quasi co-location resource group; a control channel element (CCE) index is independently calculated in each quasi co-location resource group in one first-type control channel element; one quasi co-location resource group includes k precoding resource groups, where k is a positive integer greater than or equal to 1; a boundary of the quasi co-location resource group coincides with a boundary of the precoding resource groups, where the boundary includes a time domain boundary and/or a frequency domain boundary; a resource in one precoding resource group does not belong to more than one quasi co-location resource group; A quasi co-location resource groups are associated with A quasi co-location reference signal sets, and each quasi co-location resource group in the A quasi co-location resource groups is associated with one quasi co-location reference signal set in the A quasi co-location reference signal sets; or, a division of the quasi co-location resource group is obtained through the signaling information and/or the predetermined rule.

According to embodiments of the present disclosure, the first-type control channel element includes one of the following: a control channel resource set (CORESET), a control channel search space set, a control channel search space, time domain occasion of the control channel search space set, time domain occasion of the control channel search space, or a candidate control channel.

According to embodiments of the present disclosure, the data channel and/or the signal satisfies at least one of the following characteristics: a time interval between the data channel and/or the signal and a control channel for scheduling the data channel and/or the signal is less than a predetermined threshold; or, a control channel for scheduling the data channel and/or the signal does not include TCI.

According to embodiments of the present disclosure, the method further includes at least one of the following: in a case where a control channel for scheduling the data channel and/or the signal is repeatedly transmitted in more than one control channel element, the time interval is a time interval between a predetermined control channel element in the more than one control channel element and the data channel and/or the signal, where the predetermined control channel element includes at least one of the following: a control channel element with a minimum index, a control channel element with a greatest index, or a control channel element occupying a last time resource; in a case where a control channel for scheduling the data channel and/or the signal is repeatedly transmitted in more than one control channel element, the time interval is a time interval between a last time domain symbol in time domain symbols occupied by the more than one control channel element and the data channel and/or the signal; or, in a case where the signal is an aperiodic measurement reference signal, the threshold is determined according to whether capability information reported by a communication node belongs to a predetermined set, where the communication node is a receiving communication node of the data channel and/or the signal.

According to embodiments of the present disclosure, the step of in a case where the signal is an aperiodic measurement reference signal, determining the threshold according to whether capability information reported by a communication node belongs to a predetermined set includes: in a case where the capability information reported by the communication node belongs to the predetermined set, determining the threshold as the capability information reported by the communication node; in a case where the capability information reported by the communication node does not belong to the predetermined set, determining the threshold as a fixed value; in a case where the capability information reported by the communication node does not belong to the predetermined set, determining the threshold as a maximum value in the predetermined set; in a case where the capability information reported by the communication node belongs to the predetermined set of {14 time domain symbols, 28 time domain symbols, and 48 time domain symbols}, determining the threshold as the capability information reported by the communication node; in a case where the capability information reported by the communication node does not belong to the predetermined set of {14 time domain symbols, 28 time domain symbols, and 48 time domain symbols}, determining the threshold as a fixed value of 48 time domain symbols; the capability information reported by the communication node is configured to indicate a minimum time interval between the aperiodic measurement reference signal and a control channel for scheduling the aperiodic measurement reference signal; or the capability information reported by the communication node is configured to indicate a minimum time interval for receptions of aperiodic measurement reference signals using a quasi co-location reference signal set of an aperiodic measurement reference signal indicated in the control channel for scheduling the aperiodic measurement reference signal.

According to embodiments of the present disclosure, one second time unit includes at least one of the following: one time slot; one first time unit; or one time domain symbol.

According to embodiments of the present disclosure, one reference signal element includes at least one of the following: one quasi co-location reference signal set, or, one port group.

The method for determining a quasi co-location reference signal set provided in embodiments of the present disclosure includes: determining first information according to signaling information and/or a predetermined rule, where the first information includes at least one of the following: unit granularities of first time units, information on a number of the first time units included between a control channel and a data channel and/or a signal, unit index information of a second time unit at which the data channel and/or the signal is located, a number of reference signal elements of a control channel element, a number of reference signal elements of the data channel and/or the signal, an index of the reference signal elements of the control channel element, an index of the reference signal elements of the data channel and/or the signal, a second-type quasi co-location reference signal set configured in the control channel element, or a number of time domain symbols included in one time slot, where one reference signal element includes at least one of the following: one quasi co-location reference signal set or one port group; and determining, according to the first information, a quasi co-location reference signal set of a port group included in the data channel and/or the signal. In this manner, due to a flexible configuration for the first information, the flexibility of the default beam can be effectively improved.

Example One

According to embodiments of the present disclosure, in a case where a time interval between a PDCCH for scheduling a PDSCH/AP-CSI-RS and a PDSCH is less than a predetermined threshold, the quasi co-location reference signal set of the PDSCH/AP-CSI-RS is acquired according to one or more quasi co-location reference signal sets of a control channel element including control channel elements satisfying a second predetermined characteristic and in a first time unit including control channel elements satisfying a first predetermined characteristic and closest to the PDSCH/AP-CSI-RS.

According to embodiments of the present disclosure, the control channel element satisfying the first predetermined characteristic includes at least one of the following: the control channel element belonging to a control channel element group that corresponds to the data channel and/or the signal; the control channel element locating at a frequency domain bandwidth index that corresponds to a frequency domain bandwidth index at which the data channel and/or the signal is located; the control channel element in a predetermined frequency domain bandwidth included in the first time unit, where a number of reference signal elements included in the control channel element and a number of reference signal elements included in the data channel and/or the signal satisfy a predetermined condition; the control channel element, where the number of the reference signal elements included in the control channel element and the number of the reference signal elements included in the data channel and/or the signal satisfy a predetermined condition; the control channel element being configured with transmission configuration indication information (TCI), where the control channel element configured with the TCI indicates that the control channel element is associated with one TCI index, one TCI index includes one or more quasi co-location reference signal set, and if a quasi co-location reference signal set is directly obtained through the control channel element configured with a synchronization signal block (SSB), the control channel element does not satisfy the first predetermined characteristic; the control channel element corresponding to an quasi co-location reference signal set having an empty intersection with a synchronization signal; the control channel element corresponding to a frequency domain bandwidth being in an active state; or the control channel element corresponding to at least one activated transmission configuration indication information (TCI), for example, one control channel element corresponds to one TCI activated by MAC-CE.

According to embodiments of the present disclosure, the control channel element satisfying the second predetermined characteristic includes at least one of the following: the control channel element having the minimum control channel element index in the first time unit; the control channel element configured with transmission configuration indication information (TCI); the control channel element corresponding to at least one activated transmission configuration indication information (TCI); or the control channel element having the minimum control channel element index, where the control channel element is in a control channel element set satisfying the first predetermined characteristic, and the control channel element set is in the first time unit.

Information of granularities of the first time units is determined according to the signaling information and/or the predetermined rule, where the granularities of the first time units include at least one of the following: x time domain symbols or y time slots, where y is a positive integer greater than or equal to 1, and x satisfies at least one of the following characteristic: a number of time domain symbols included in m time slots is an integer multiple of x, and m is a positive integer greater than or equal to 1; x is less than or equal to the number of the time domain symbols included in one time slot; m time slots include more than one granularity of the first time units, and a number of time domain symbols included in different granularities of the first time units is inconsistent; or the unit granularities of the first time units are associated with the index information at which the data channel and/or the signal is located.

Figure 2:
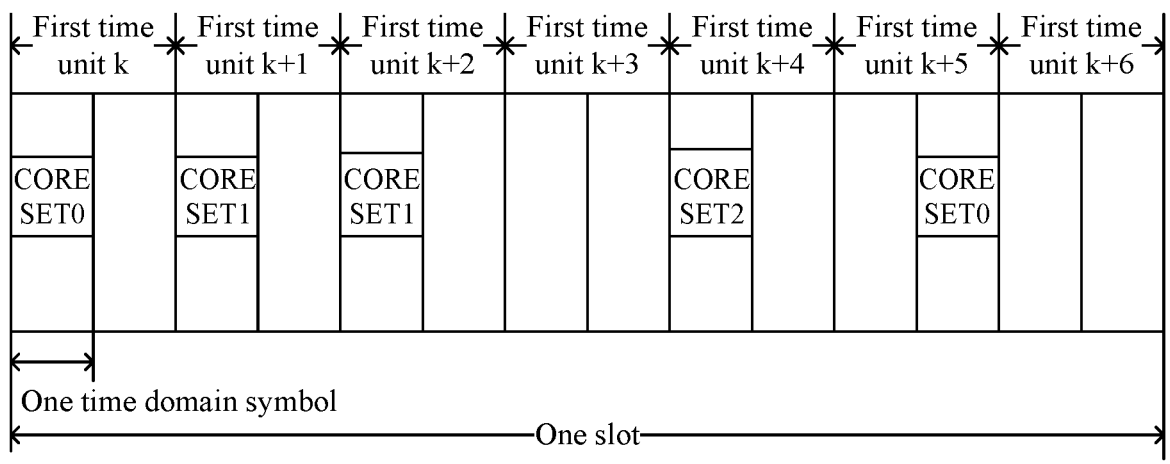
FIG. 2 is a schematic diagram of a first time unit according to an embodiment of the present disclosure.

Specifically, for example, one first time unit is 2/4/7 time domain symbols in one slot. As shown in FIG. 2, one first time unit is two time domain symbols in one slot, and the first time domain unit with the minimum index in one slot includes the first time domain symbol of the slot. For example, PDSCH/AP-CSI-RS is in the first time unit with an index of (k+3), the first time unit that includes CORESET and is closest to the PDSCH/AP-CSI-RS is the first time unit with an index of (k+2), and the quasi co-location reference signal set of the PDSCH/AP-CSI-RS is the quasi co-location reference signal set of the lowest CORESET in (k+2) first time units, that is, the quasi co-location reference signal set of CORESET1. Similarly, the PDSCH/AP-CSI-RS is in the first time unit with an index of (k+5), and the quasi co-location reference signal set of the PDSCH/AP-CSI-RS is the quasi co-location reference signal set of the lowest CORESET in (k+5) first time units, that is, the quasi co-location reference signal set of CORESET0.

Figure 3:
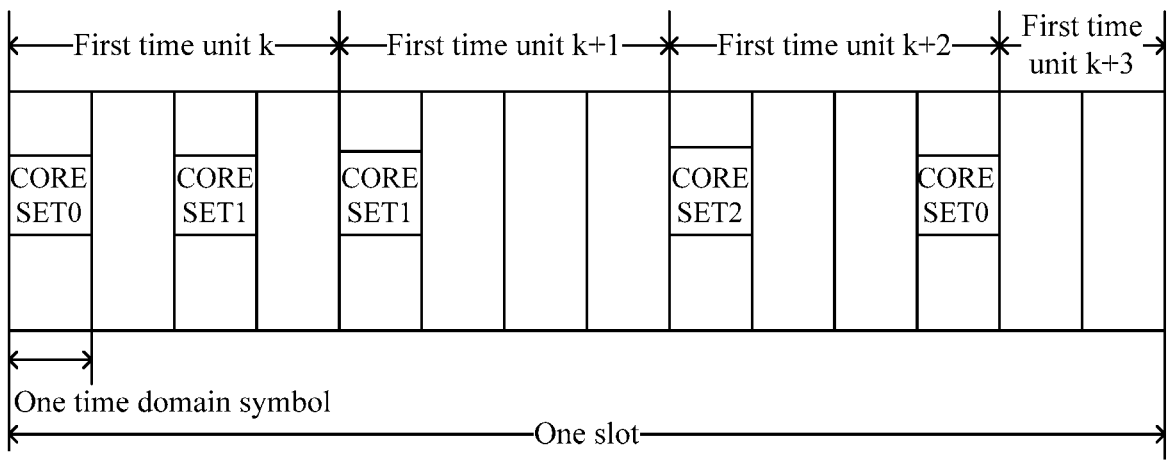
FIG. 3 is another schematic diagram of a first time unit according to an embodiment of the present disclosure.

For another example, as shown in FIG. 3, one first time unit includes four consecutive time domain symbols in one slot. Since one slot includes 14 time domain symbols, the number of time domain symbols included in the last first time unit (that is, the first time unit with an index of (k+3)) in one slot is 2, that is, the time domain resource included in one first time unit does not pass slots.

Figure 4:
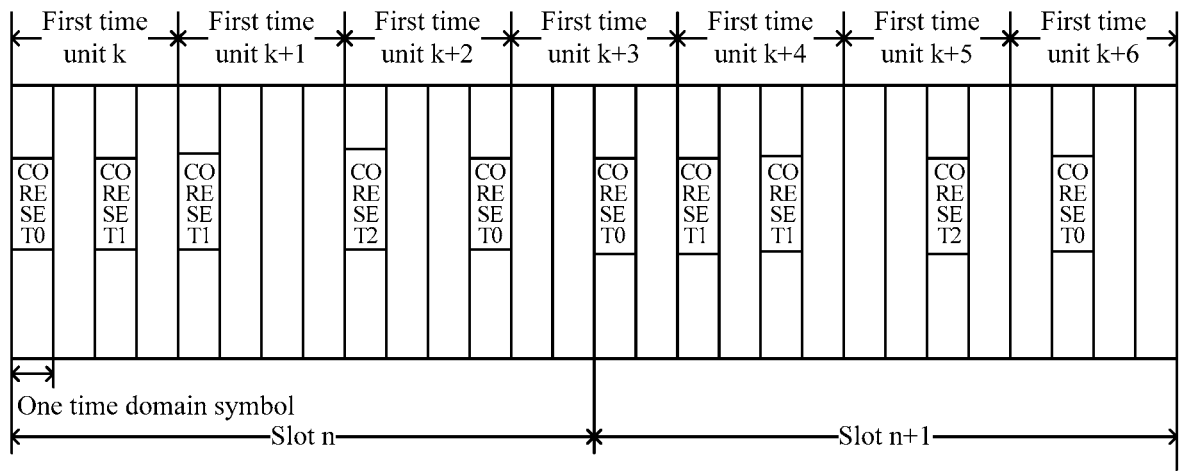
FIG. 4 is yet another schematic diagram of a first time unit according to an embodiment of the present disclosure.

For another example, as shown in FIG. 4, one first time unit includes four time domain symbols, and the time domain symbol included in one first time unit may pass slots. In this case, the time domain symbol and/or the index of the first time unit included in one first time unit is determined according to an time slot unit index and the number (12/14) of time domain symbols included in one time slot. Two time slots include integer multiples of first time units, and then the first time unit index at which the time domain symbol with an index of l in the n-th time slot is located is $$\frac{nN_{symbol}^{slot} + l}{N_{symbol}^{unit1}}$$

where $N_{symbol}^{slot}$ is the number of time domain symbols included in one slot, and $N_{symbol}^{unit1}$ is the number of time domain symbols include in one first time unit.

Figure 5:
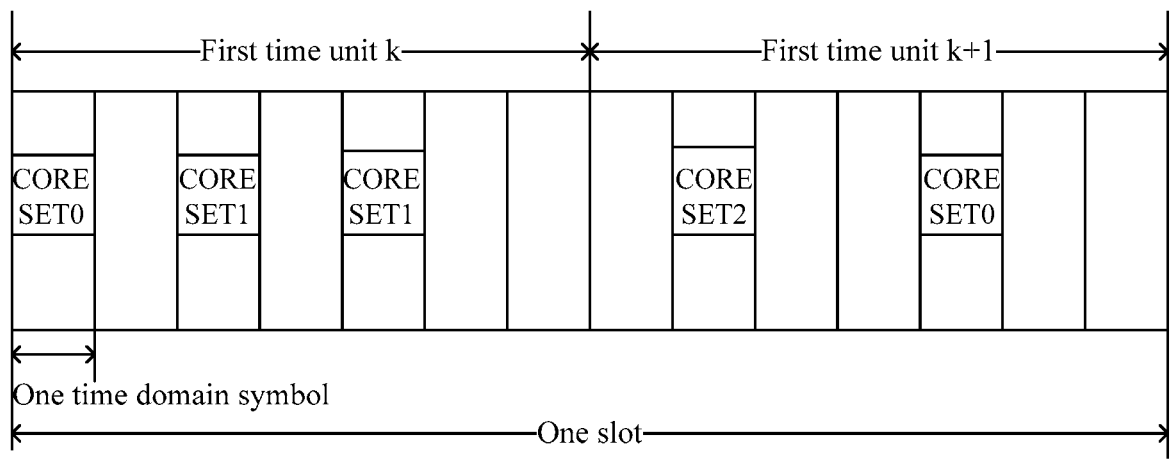
FIG. 5 is yet another schematic diagram of a first time unit according to an embodiment of the present disclosure.

For another example, as shown in FIG. 5, one first time unit includes seven consecutive time domain symbols in one slot.

Figure 6A:
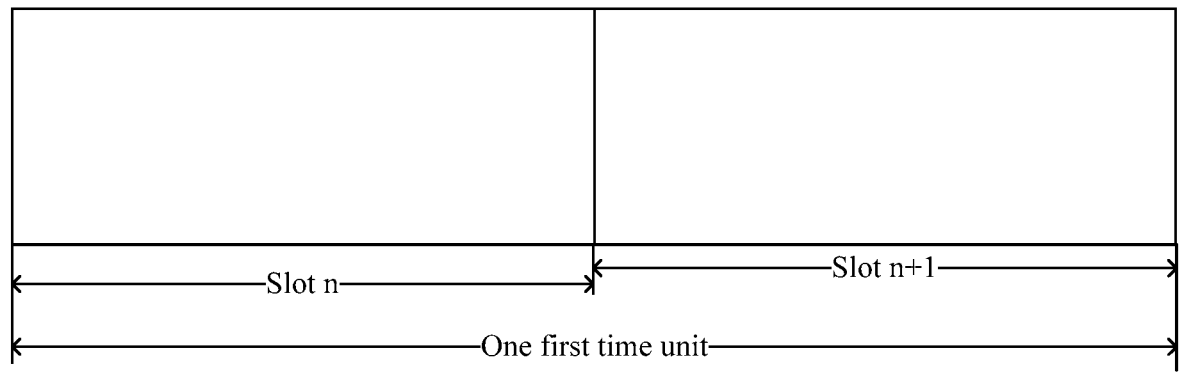
FIG. 6*a* is yet another schematic diagram of a first time unit according to an embodiment of the present disclosure.

For another example, as shown in FIG. 6a, one first time unit includes two slots. For example, the index of the first time unit at which one slot with an time slot index of n is located is $$\left\lfloor \frac{sN_{slot}^{subframe,\mu} + n}{y} \right\rfloor,$$

where $N_{slot}^{subframe,\mu}$ is the number of slots with an subcarrier interval of $2^{\mu}*15$ KHz included in one subframe, s is the number of the subframe at which slot n is located, and y is the number of slots included in one first time unit.

According to embodiments of the present disclosure, information of granularities of the first time units is determined according to the signaling information and/or the predetermined rule, and a quasi co-location reference signal set of the PDSCH/AP-CSI-RS is acquired according to one or more quasi co-location reference signal sets including control channel elements satisfying the second predetermined characteristic and in a first time unit including control channel elements satisfying the first predetermined characteristic and closest to the PDSCH/AP-CSI-RS. One or more quasi co-location reference signals of the one control channel include a second-type quasi co-location reference signal set configured in the control channel element.

According to embodiments of the present disclosure, unit granularities of the first time units corresponding to different DMRS port groups of one PDSCH/different CSI-RS port groups of the AP-CSI-RS are different. For example, the unit granularity of the first time unit corresponding to the first port group is one slot, and the unit granularity of the first time unit corresponding to the second port group is two time domain symbols, so that the quasi co-location reference signals of the first port group includes one or more quasi co-location reference signals of control channel elements satisfying the second predetermined characteristic and in a slot including control channel elements satisfying the first predetermined characteristic and closest to the PDSCH/AP-CSI-RS, and the quasi co-location reference signals of the second port group includes one or more quasi co-location reference signals including control channel elements satisfying the second predetermined characteristic and in the first time unit shown in FIG. 2 (that is, the one first time unit includes two time domain symbols). The first time unit shown in FIG. 2 includes control channel elements satisfying the first predetermined characteristic, and is closest to the PDSCH/AP-CSI-RS.

According to embodiments of the present disclosure, unit granularities of the first time unit of one PDSCH/AP-CSI-RS is associated with RNTI of the control channel for scheduling the PDSCH/AP-CSI-RS. For example, in a case of C-RNTI, the unit granularity of the first time unit is one value, while in a case of MCS-C-RNTI, the unit granularity of the first time unit is another value.

According to embodiments of the present disclosure, the flexibility of the default beam can be effectively improved by flexibly configuring and determining the granularity of the first time unit.

Example Two

According to embodiments of the present disclosure, in a case where the quasi co-location reference signal of the PDSCH/AP-CSI-RS is acquired according to the quasi co-location reference signal set of the PDCCH, for example, a distance between the PDCCH for scheduling the PDSCH/AP-CSI-RS and the PDSCH is less than a predetermined threshold; or the PDCCH for scheduling the PDSCH/AP-CSI-RS does not include TCI, where one TCI index corresponds to one or more quasi co-location reference signal sets, and the following scenarios 1 to 5 need to be considered.

In scenario one, the number c of port groups included in the PDSCH/AP-CSI-RS is less than the number d of port groups included in the PDCCH, and in this case, the port group index of the PDCCH corresponding to the i-th port group of the PDSCH/AP-CSI-RS is determined according to the signaling information. For example, the i-th port group corresponds to {the $j_1$-th and the $j_2$-th} port groups of the PDCCH, and the quasi co-location reference signal of the i-th port group of the PDSCH/AP-CSI-RS is acquired according to the quasi co-location reference signal of {the $j_1$-th and the $j_2$-th} port groups of the PDCCH, where {the $j_1$-th and the $j_2$-th} port groups of the PDCCH correspond to the i-th port group; or the i-th port group corresponds to {the $j_1$-th} port group of the PDCCH, and the quasi co-location reference signal of the i-th port group of the PDSCH/AP-CSI-RS is acquired according to the quasi co-location reference signal of {the $j_1$-th} port group of the PDCCH, where {the $j_1$-th} port group of the PDCCH corresponds to the i-th port group. $j_1$ and $j_2$ belong to $\{0, \ldots, d-1\}$; or $j_1$ and $j_2$ belong to $\{1, \ldots, d\}$.

In scenario two, the number c of the quasi co-location reference signal sets corresponding to one port group of the PDSCH/AP-CSI-RS is less than the number d of the quasi co-location reference signal sets corresponding to one port group of the PDCCH, and in this case, the quasi co-location reference signal set needed for determining the one port group of the PDSCH/AP-CSI-RS is acquired according to one or more quasi co-location reference signal sets in d quasi co-location reference signal sets corresponding to one port group of the PDCCH.

In scenario 3, the number c of port groups included in the PDSCH/AP-CSI-RS is greater than the number c of port groups include in the PDCCH, and in this case, the port group index of the PDCCH corresponding to the i-th port group of the PDSCH/AP-CSI-RS is determined according to the signaling information. For example, the quasi co-location reference signal set of one of the first d port groups of the PDSCH/AP-CSI-RS is acquired according to the quasi co-location reference signal in a respective one port group among the d port groups of the PDCCH, the quasi co-location reference signal sets of the remaining (c-d) port groups of the PDSCH/AP-CSI-RS are acquired according to second-type quasi co-location reference signal sets configured in the CORESET and at which the PDCCH is located.

In scenario 4, the number c of port groups included in the PDSCH/AP-CSI-RS is equal to the number c of port groups of the PDCCH, where d is greater than 1, and in this case, the port group index of the PDCCH corresponding to the i-th port group of the PDSCH/AP-CSI-RS is determined according to the signaling information, where the quasi co-location reference signal set of the i-th port group of the PDSCH/AP-CSI-RS is acquired according to the quasi co-location reference signal set of the port group of the PDCCH, where the port group of the PDCCH corresponds to the i-th port group.

In scenario 5, the number c of the quasi co-location reference signal sets of the PDSCH/AP-CSI-RS is not equal to the number d of the quasi co-location reference signal sets of the PDCCH; or d is greater than 1; or c is greater than 1. A correspondence between c quasi co-location reference signal sets of the PDSCH/AP-CSI-RS and d quasi co-location reference signal sets of the PDCCH is determined according to the signaling information or the predetermined rule, and the i-th quasi co-location reference signal set of the PDSCH/AP-CSI-RS is acquired according to one or more quasi co-location reference signal sets of the PDCCH, where the one or more quasi co-location reference signal sets of the PDCCH correspond to the i-th quasi co-location reference signal set of the PDSCH/AP-CSI-RS. The quasi co-location reference signal sets of the PDSCH/AP-CSI-RS include at least one of the following: quasi co-location reference signal sets of different port groups or quasi co-location reference signal sets of one port group on different quasi co-location resources; the quasi co-location reference signal sets of the PDCCH include at least one of the following: quasi co-location reference signal sets of different port groups, quasi co-location reference signal sets of one port group on different quasi co-location resources, first-type quasi co-location reference sets, or second-type quasi co-location reference sets.

According to embodiments of the present disclosure, the second-type quasi co-location reference signal set is in the CORESET/control channel element and configured for the PDSCH/AP-CSI-RS, and an association between the demodulation reference signal in the CORESET/control channel element and the second-type quasi co-location reference signal set does not exist, that is, a quasi co-location relationship between the demodulation reference signal in the CORESET/control channel element and the second-type quasi co-location reference signal set is not satisfied, and a quasi co-location relationship between the demodulation reference signal in the CORESET/control channel element and the first-type quasi co-location reference signal set corresponding to the CORESET/control channel element is satisfied.

Example Three

According to embodiments of the present disclosure, in a case where a time interval between the PDCCH for scheduling an aperiodic measurement reference signal and the aperiodic measurement reference signal is less than a predetermined threshold, the quasi co-location reference signal of the aperiodic measurement reference signal is acquired according to the quasi co-location reference signal of the PDSCH/PDCCH; and in a case where a time interval between the PDCCH for scheduling an aperiodic measurement reference signal and the aperiodic measurement reference signals is greater than or equal to the predetermined threshold, the quasi co-location reference signal of the aperiodic measurement reference signal is acquired according to the quasi co-location reference signal information of the aperiodic measurement reference signal and indicated in the PDCCH.

According to embodiments of the present disclosure, the threshold is obtained according to whether capability information reported by the terminal belongs to a predetermined set. For example, in a case where the capability information reported by the terminal belongs to a predetermined set, and thus the threshold is the capability information reported by the terminal; and, in a case where the reported capability information does not belong to the predetermined set, the threshold is a fixed value or the threshold is a maximum value in the predetermined set.

Specifically, for example, in a case where the capability information reported by the terminal belongs to the predetermined set of {14 time domain symbols, 28 time domain symbols, and 48 time domain symbols}, the threshold is the capability information reported by the terminal; and in a case where the capability information reported by the terminal does not belong to the predetermined set of {14 time domain symbols, 28 time domain symbols, and 48 time domain symbols}, for example, the capability information reported by the terminal belongs to {224 time domain symbols, 336 time domain symbols}, the threshold is a fixed value of 48 time domain symbols or is a maximum value in the predetermined set. The capability information reported by the terminal is configured to indicate a minimum time interval required for the reception of the aperiodic measurement reference signal to which the terminal applies a quasi co-location reference signal set of an aperiodic measurement reference signal indicated in the control channel for scheduling the aperiodic measurement reference signal.

Example Four

According to embodiments of the present disclosure, the quasi co-location reference signal set of the PDSCH/AP-CSI-RS is determined according to both information on the number of the first time units included between the PDSCH/AP-CSI-RS and the control channel element and remainder p of the predetermined value.

The PDCCH includes control channel elements satisfying the second predetermined characteristic and in a first time unit k including control channel elements satisfying the first predetermined characteristic and closest to the PDSCH/AP-CSI-RS. The quasi co-location reference signal of the PDSCH/AP-CSI-RS is acquired according to the quasi co-location reference signal of the Q-th control channel element included in the first time unit k, where the Q-th control channel element satisfies the second predetermined characteristic, the acquisition parameter of the Q-th control channel element includes the remainder p value. Alternatively, the quasi co-location reference signal set of the PDSCH/AP-CSI-RS is acquired according to the R-th quasi co-location reference signal set of one control channel element satisfying the second predetermined characteristic and included in the first time unit k, and the acquisition parameter of the R-th quasi co-location reference signal set includes the remainder p value.

Alternatively, the control channel element is the PDCCH for scheduling the PDSCH/AP-CSI-RS. The quasi co-location reference signal of the PDSCH/AP-CSI-RS is acquired according to the R1-th quasi co-location reference signal set of the PDCCH, where the acquisition parameter of the R1-th quasi co-location reference signal set includes the remainder p value.

Example Five

According to embodiments of the present disclosure, the quasi co-location reference signal set of the PDSCH/AP-CSI-RS is determined according to both unit index information of the second time unit at which the PDSCH/AP-CSI-RS is located and the remainder s of the predetermined value.

The quasi co-location reference signal of the PDSCH/AP-CSI-RS is acquired according to the quasi co-location reference signal of the Q-th control channel element included in the first time unit k, where the Q-th control channel element satisfies the second predetermined characteristic, where the acquisition parameter of the Q-th control channel element includes the remainder s value. Alternatively, the quasi co-location reference signal set of the PDSCH/AP-CSI-RS is acquired according to the R-th quasi co-location reference signal set of one control channel element included in the first time unit k, where the one control channel element satisfies the second predetermined characteristic, where the acquisition parameter of the R-th quasi co-location reference signal set includes the remainder s value. The first time unit k includes the control channel element satisfying the first predetermined characteristic and is closest to the PDSCH/AP-CSI-RS.

Alternatively, the quasi co-location reference signal of the PDSCH/AP-CSI-RS is acquired according to the R1-th quasi co-location reference signal set of the PDCCH for scheduling the PDSCH/AP-CSI-RS, where the acquisition parameter of the R1-th quasi co-location reference signal set includes the remainder s value; where one DMRS port of one PDCCH in one quasi co-location reference resource group corresponds to one or more quasi co-location reference signal sets. One PDCCH includes one or more quasi co-location resource groups. One DMRS of one PDCCH corresponds to one or more quasi co-location reference signal sets on multiple quasi co-location resource groups.

Example Six

According to embodiments of the present disclosure, in a case where a time interval between the PDCCH for scheduling the PDSCH/AP-CSI-RS and the PDSCH/AP-CSI-RS is less than a predetermined threshold, the quasi co-location reference signal set of the PDSCH/AP-CSI-RS is acquired according to one or more quasi co-location reference signal sets of a control channel element satisfying a second predetermined characteristic in a first time unit, where the first time unit is closest to the PDSCH/AP-CSI-RS, and includes a control channel element satisfying a first predetermined characteristic.

According to embodiments of the present disclosure, the PDCCH is repeatedly transmitted through a plurality of candidate control channels or a plurality of control channel elements, and thus a time interval between the PDCCH and the PDSCH/AP-CSI-RS is time interval one or time interval two.

Figure 6B:
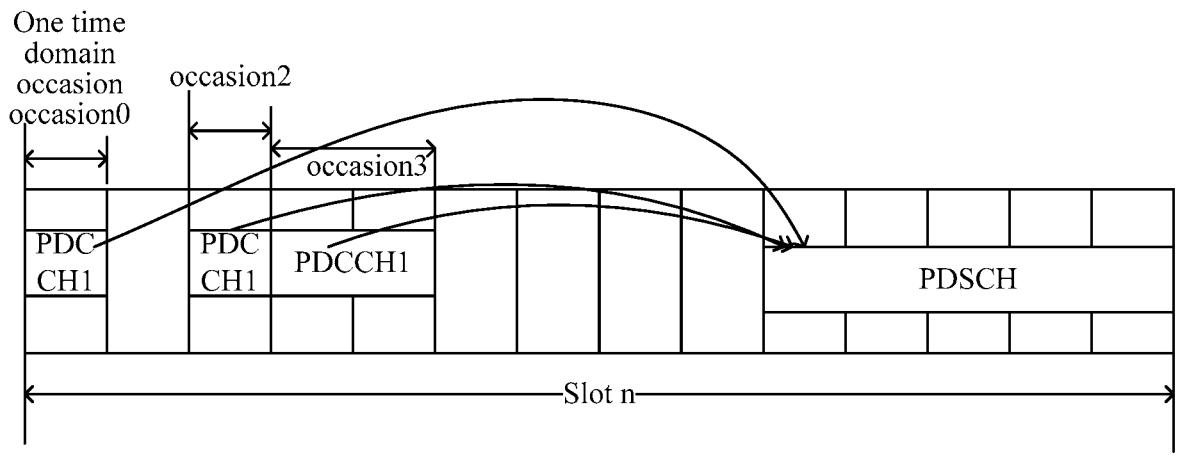
FIG. 6*b* is yet another schematic diagram of a first time unit according to an embodiment of the present disclosure.

Time interval one is a time interval between a predetermined control channel element in the more than one control channel element and the data channel and/or the signal. As shown in FIG. 6b, one PDCCH1 is repeatedly transmitted in time domain occasions of three search space sets (one occasion corresponds to one control channel element, and different occasions may correspond to different CORESETs/search space sets), and thus the time interval may be an interval between the earliest control channel element occasion 1 in terms of time in the retransmission and the PDSCH, that is, the time interval includes eight time domain symbols; or time interval one is an interval between the end time domain symbol of the last control channel element occasion 3 in terms of time in the retransmission and the PDSCH, that is, the time interval includes four time domain symbols.

Time interval two is a time interval between the last time domain symbol in the time domain symbol set occupied by the more than one control channel element and the data channel and/or the signal. As shown in FIG. 6b, the PDCCH 1 is repeatedly transmitted in three occasions, and the last time domain symbol in the time domain symbol set occupied by the three occasions is the last time symbol in occasion 3, that is, the time interval between the PDCCH and the PDSCH includes four time domain symbols.

Example Seven

According to embodiments of the present disclosure, one PDSCH/CSI-RS/one CORESET/one search space set/one search space/time domain occasion of one search space set/time domain occasion of one search space includes more than one quasi co-location resource group on the frequency domain, and/or one PDSCH/CSI-RS includes one or more quasi co-location resource groups on the frequency domain. Where, the quasi co-location resource group satisfies at least one of the following characteristics: quasi co-location reference signal sets of channels and/or signals in one quasi co-location resource group are same; each quasi co-location resource group corresponds to one quasi co-location reference signal set; channels and/or signals in different quasi co-location resource groups do not satisfy a quasi co-location relationship with respect to quasi co-location parameters of a type; one demodulation reference signal port corresponds to one quasi co-location reference signal set in each quasi co-location resource group; one demodulation reference signal port in different quasi co-location resource groups does not satisfy the quasi co-location relationship with respect to quasi co-location parameters of a type; one first-type control channel element includes more than one quasi co-location resource group; a CCE index is independently calculated in each quasi co-location resource group in one first-type control channel element; one quasi co-location resource group includes k precoding resource groups, where k is a positive integer greater than or equal to 1; a boundary of the quasi co-location resource group coincides with a boundary of the precoding resource groups, where the boundary includes a time domain boundary and/or a frequency domain boundary; a resource in one precoding resource group does not belong to more than one quasi co-location resource group; A quasi co-location resource groups are associated with A quasi co-location reference signal sets, and each quasi co-location resource group in the A quasi co-location resource groups is associated with one quasi co-location reference signal set in the A quasi co-location reference signal sets; or a division of the quasi co-location resource group is obtained through the signaling information and/or the predetermined rule, where the first-type control channel element includes one of the following: a COREST, a control channel search space set, a control channel search space, time domain occasion of the control channel search space set, time domain occasion of the control channel search space, or a candidate control channel.

Example Eight

According to embodiments of the present disclosure, the terminal or base station determines a number of reference signal elements of data channel and/or the signal of a type included in one first time according to the signaling information and/or the predetermined rule; and, a communication node expects the number of the reference elements of the data channel and/or the signal of the same type received in one first time unit not to exceed a predetermined value. Data channel and/or the signal of different types are distinguished by at least one piece of the following information: an RNTI type of a control channel for scheduling the data channel and/or the signal, a frequency domain bandwidth at which the data channel and/or the signal is located, or a relationship between a time interval being between a control channel for scheduling the data channel and/or the signal and the data channel and/or the signal and a predetermined threshold. For example, the number of the quasi co-location reference signal sets/port groups in one BWP in one first time unit cannot be greater than the predetermined value, where the quasi co-location reference signal sets/port groups are scheduled by the PDCCH, and the PDCCH is scrambled by C-RNTI; and/or, the number of the quasi co-location reference signal sets/port groups in one frequency domain bandwidth in one first time unit cannot be greater than the first predetermined threshold, where the quasi co-location reference signal sets/port groups are scheduled by the PDCCH, and the PDCCH is scrambled by C-RNTI, where the time interval between the PDCCH for scheduling the PDSCH/AP-CSI-RS and the PDSCH/AP-CSI-RS is less than the predetermined threshold; and/or, the number of the quasi co-location reference signal sets/port groups in one frequency domain bandwidth in one first time unit cannot be greater than a second predetermined threshold, where the quasi co-location reference signal sets/port groups are scheduled by the PDCCH, and the PDCCH is scrambled by C-RNTI, where the time interval between the PDCCH for scheduling the PDSCH/AP-CSI-RS and the PDSCH/AP-CSI-RS is greater than or equal to the predetermined threshold.

According to embodiments of the present disclosure, the port group includes one or more of the following port groups: a port group of demodulation reference signal, a port group of measurement reference signal, a port group of phase tracking reference signal, or a port group of synchronization signal.

According to embodiments of the present disclosure, the quasi co-location reference signal set includes at least one of the following: a quasi co-location reference signal set of the synchronization signal, a quasi co-location reference signal set of the phase tracking reference signal, a quasi co-location reference signal set of the measurement reference signal, or a quasi co-location reference signal set of the demodulation reference signal. In a case where one signal is not configured with a quasi co-location reference signal set, the one signal itself is its own quasi co-location reference signal set.

Figure 7:
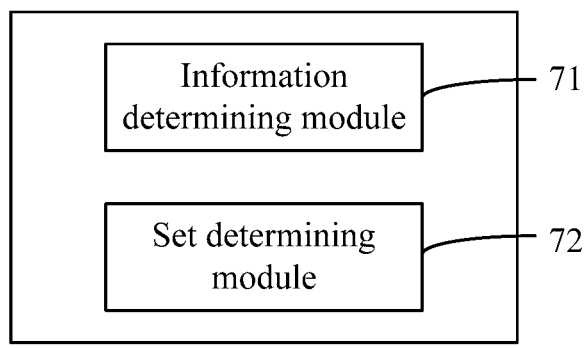
FIG. 7 is a schematic diagram of an apparatus for determining a quasi co-location reference signal set according to an embodiment of the present disclosure.

Embodiments of the present disclosure further provide an apparatus for determining a quasi co-location reference signal set. As shown in FIG. 7, the apparatus for determining a quasi co-location reference signal set may include an information determination module 71 and a set determination module 72. The information determination module 71 is configured to determine first information according to signaling information and/or a predetermined rule, where the first signal includes at least one of the following: unit granularities of first time units, information on a number of the first time units included between a control channel and a data channel and/or a signal, unit index information of a second time unit at which the data channel and/or the signal is located, a number of reference signal elements of a control channel element, a number of reference signal elements of the data channel and/or the signal, an index of the reference signal elements of the control channel element, an index of the reference signal elements of the data channel and/or the signal, a second-type quasi co-location reference signal set configured in the control channel element, or a number of time domain symbols included in one time slot, where one reference signal element is at least one of the following: one quasi co-location reference signal set or one port group. The set determination module 72 is configured to determine, according to the first information, a quasi co-location reference signal set of a port group included in the data channel and/or the signal.

According to embodiments of the present disclosure, the number of the reference signal elements of the control channel/data channel/signal may also be referred to as the number of the reference signal elements corresponding to the control channel/data channel/signal, or, as the number of the reference signal elements included in the control channel/data channel/signal.

According to embodiments of the present disclosure, the port group is at least one of the following port groups: a port group of demodulation reference signal, a port group of measurement reference signal, a port group of phase tracking reference signal, or a port group of synchronization signal.

According to embodiments of the present disclosure, one reference signal element includes at least one of the following: one quasi co-location reference signal set, or, one port group.

According to embodiments of the present disclosure, the unit granularities of the first time units include one of x time domain symbols or y time slots, where y is an positive integer greater than or equal to 1; and x satisfies at least one of the following characteristics: a number of time domain symbols included in m time slots is an integer multiple of x, and m is a positive integer greater than or equal to 1; x is less than or equal to the number of the time domain symbols included in one time slot; or m time slots include more than one granularity of the first time units, and a number x of time domain symbols included in different granularities of the first time units is inconsistent.

According to embodiments of the present disclosure, the unit granularities of the first time units satisfy at least one of the following characteristics: the unit granularities of the first time units are associated with the unit index information of the second time unit where the data channel and/or the signal is located; the unit granularities of the first time units are associated with the index of the reference signal elements of one data channel and/or one data signal; each port group of one data channel and/or one data signal corresponds to a respective one of the unit granularities of the first time units; unit granularities of first time units each of which corresponds to a respective one of two port groups of one data channel and/or one data signal are different; a time domain resource included in one of the first time units does not belong to more than one time slot; or one of the first time units includes consecutive time domain symbols.

According to embodiments of the present disclosure, the determined power information includes at least one of the following: acquiring a quasi co-location reference signal set corresponding to an port group of the data channel and/or the signal, according to one or more quasi co-location reference signal sets of a control channel element satisfying a second predetermined characteristic in a first time unit, where the first time unit is closest to the data channel and/or the signal and includes a control channel element satisfying a first predetermined characteristic. According to embodiments of the present disclosure, the control channel element satisfying the first predetermined characteristic includes at least one of the following: the control channel element belonging to a control channel element group that corresponds to the data channel and/or the signal; the control channel element locating at a frequency domain bandwidth index that corresponds to a frequency domain bandwidth index at which the data channel and/or the signal is located; the control channel element, wherein the number of the reference signal elements included in the control channel element and the number of the reference signal elements included in the data channel and/or the signal satisfy a predetermined condition; the control channel element being configured with transmission configuration indication information (TCI); or the control channel element corresponding to an quasi co-location reference signal set having an empty intersection with a synchronization signal.

According to embodiments of the present disclosure, the predetermined condition includes at least one of the following: the number of the reference signal elements of the control channel element is equal to the number of the reference signal elements of the data channel and/or the signal; or the number of the reference signal elements of the control channel element is greater than or equal to the number of the reference signal elements of the data channel and/or the signal.

According to embodiments of the present disclosure, that the quasi co-location reference signal set of the port group is determined according to the number information a of the first time unit between the control channel and the data channel and/or the signal, and the unit index information n of the second time unit where the data channel and/or the signal is located, includes: the quasi co-location reference signal set of the port group is determined according to at least one of the following information: mod(a, A), where A is a predetermined value greater than or equal to 1; mod(n, N), wherein N is a predetermined value greater than or equal to 1; or, the second time unit includes integer multiples of the first time units.

According to embodiments of the present disclosure, the step of determining the quasi co-location reference signal set of the port group of the data channel and/or the signal according to a number d of the reference signal elements of the control channel and/or a number c of the reference signal elements of the data channel and/or the signal may include: in a case where a first condition is satisfied, determining a correspondence between the c reference signal elements of the data channel and/or the signal and the d reference signal elements of the control channel according to the signaling information and/or the predetermined rule, where the first condition includes at least one of the following: c is not equal to d, c is equal to d and greater than 1, d is greater than 1, or c is greater than 1.

According to embodiments of the present disclosure, the step of determining the correspondence between the c reference signal elements of the data channel and/or the signal and the d reference signal elements of the control channel according to the signaling information and/or the predetermined rule may include: determining {a $j_1$-th reference signal element, a $j_2$-th reference signal element, . . . , and a $j_e$-th reference signal element} of a control channel element corresponding to an i-th reference signal element of the data channel and/or the signal according to the signaling information and/or the predetermined rule, where e is a positive integer greater than or equal to 1, and/or e is a predetermined value.

According to embodiments of the present disclosure, an i-th port group of the data channel and/or the signal corresponds to {a $j_1$-th port group, a $j_2$-th port group, . . . , and a $j_e$-th port group} of the control channel element, a quasi co-location reference signal set of the i-th port group includes a quasi co-location reference signal set list formed by {a quasi co-location reference signal set list of a $j_1$-th port group, a quasi co-location reference signal set list of a $j_2$-th port group, . . . , and a quasi co-location reference signal set list of a $j_e$-th port group}; and/or the i-th port group of the data channel and/or the signal corresponds to {a $j_1$-th quasi co-location reference signal set, a $j_2$-th quasi co-location reference signal set, . . . , a $j_e$-th quasi co-location reference signal set} of the control channel element, and a quasi co-location reference signal set of the i-th port group includes the quasi co-location reference signal set list formed by {the $j_1$-th quasi co-location reference signal set, the $j_2$-th quasi co-location reference signal set, . . . , the $j_e$-th quasi co-location reference signal set}; and/or {a $j_1$-th quasi co-location reference signal set, a $j_2$-th quasi co-location reference signal set, . . . , and a $j_e$-th quasi co-location reference signal set} corresponds to one port group q of the control channel element, a quasi co-location reference signal of the port group q is {a first quasi co-location reference signal set, a second quasi co-location reference signal set, . . . , and an E-th quasi co-location reference signal set}, and {the $j_1$-th quasi co-location reference signal set, the $j_2$-th quasi co-location reference signal set, . . . , and the $j_e$-th quasi co-location reference signal set} is a subset of {the first quasi co-location reference signal set, the second quasi co-location reference signal set, . . . , and the E-th quasi co-location reference signal set}.

According to embodiments of the present disclosure, the number of the quasi co-location reference signal sets included in one data channel and/or one data signal satisfies at least one of the following characteristics: one port group of one data channel and/or one data signal is associated with g quasi co-location reference signal sets on f quasi co-location resource groups, where f is a positive integer greater than or equal to 1, g is a positive integer greater than or equal to f, or the one port group is associated with one or more quasi co-location reference signals on one resource group, where the resource group is a time domain resource group and/or a frequency domain resource group, and the f resource groups belong to one data channel and/or one data signal. According to embodiments of the present disclosure, f quasi co-location resource groups satisfy at least one of the following characteristics: division of resource groups included in one data channel and/or one data signal is determined according to the signaling information and/or the predetermined rule; and/or an association between the number of the reference signal elements of one data channel and/or one data signal and the division of the resource groups included in the data channel and/or the signal exists.

According to embodiments of the present disclosure, the port group satisfies at least one of the following characteristics: ports in one port group satisfy a quasi co-location relationship with respect to quasi co-location parameters of a type; ports in different port groups do not satisfy a quasi co-location relationship with respect to the quasi co-location parameters of the same type; each port group corresponds to one or more quasi co-location reference signal sets; or one port group is associated with one or more quasi co-location reference signal sets on one time-frequency resource.

According to embodiments of the present disclosure, the control channel element includes at least one of the following: one CORESET; one search space set; one search space; one candidate control channel; or one control channel quasi co-location resource group, where the control channel element includes the control channel for scheduling the data channel and/or the signal; or the control channel element including a control channel element satisfying the second predetermined characteristic and in the first time unit including the control channel element satisfying the first predetermined characteristic and closest to the data channel and/or the signal. The control channel quasi co-location resource group satisfies one or more of the following characteristics: control channels and/or control signals in one control channel quasi co-location resource group satisfies a quasi co-location relationship, one control channel quasi co-location resource group corresponds to one or more quasi co-location reference signal sets, or control channels and/or control signals in one control channel quasi co-location resource group do not satisfy the quasi co-location relationship.

According to embodiments of the present disclosure, the data channel and/or the signal satisfies at least one of the following characteristics: a time interval between the data channel and/or the signal and a control channel for scheduling the data channel and/or the signal is less than a predetermined threshold; or a control channel for scheduling the data channel and/or the signal does not include TCI.

According to embodiments of the present disclosure, the method further includes at least one of the following: in a case where a control channel for scheduling the data channel and/or the signal includes more than one retransmission, the time interval is a time interval between the last retransmission in the more than one retransmission and the data channel and/or the signal; or in a case where the signal is an aperiodic measurement reference signal, the threshold is determined according to whether capability information reported by a communication node belongs to a predetermined set, where the communication node is a receiving communication node of the data channel and/or the signal.

According to embodiments of the present disclosure, the step of in a case where the signal is an aperiodic measurement reference signal, determining the threshold according to whether capability information reported by a communication node belongs to a predetermined set includes: in a case where the capability information reported by the communication node belongs to the predetermined set, determining the threshold as the capability information reported by the communication node; in a case where the capability information reported by the communication node does not belong to the predetermined set, determining the threshold as a fixed value; in a case where the capability information reported by the communication node does not belong to the predetermined set, determining the threshold as a maximum value in the predetermined set; in a case where the capability information reported by the communication node belongs to the predetermined set of {14 time domain symbols, 28 time domain symbols, and 48 time domain symbols}, determining the threshold as the capability information reported by the communication node; in a case where the capability information reported by the communication node does not belong to the predetermined set of {14 time domain symbols, 28 time domain symbols, and 48 time domain symbols}, determining the threshold as a fixed value of 48 time domain symbols; the capability information reported by the communication node is configured to indicate a minimum time interval between the aperiodic measurement reference signal and a control channel for scheduling the aperiodic measurement reference signal; or the capability information reported by the communication node is configured to indicate a minimum time interval between receptions of aperiodic measurement reference signals using a quasi co-location reference signal set of an aperiodic measurement reference signal indicated in the control channel for scheduling the aperiodic measurement reference signal.

According to embodiments of the present disclosure, one second time unit includes at least one of the following: one time slot; one first time unit; or one time domain symbol.

Through the apparatus for determining a quasi co-location reference signal set provided in embodiments of the present disclosure, first information is determined according to signaling information and/or a predetermined rule, where the first information includes at least one of the following: unit granularities of first time units, information on a number of the first time units included between a control channel and a data channel and/or a signal, unit index information of a second time unit at which the data channel and/or the signal is located, a number of reference signal elements of a control channel element, a number of reference signal elements of the data channel and/or the signal, an index of the reference signal elements of the control channel element, an index of the reference signal elements of the data channel and/or the signal, a second-type quasi co-location reference signal set configured in the control channel element, or a number of time domain symbols included in one time slot, where one reference signal element includes at least one of the following: one quasi co-location reference signal set or one port group; and a quasi co-location reference signal set of a port group included in the data channel and/or the signal is determined according to the first information. In this manner, through the flexible configuration of the first information, the flexibility of the default beam can be effectively improved.

Figure 8:
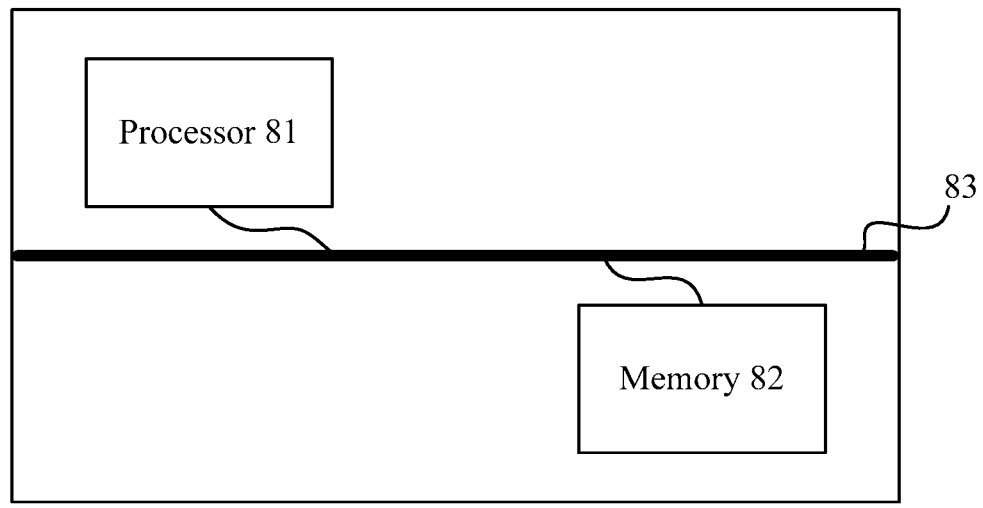
FIG. 8 is a schematic diagram of a network device according to an embodiment of the present disclosure.

This embodiment further provides a network device. As shown in FIG. 8, the network device includes a processor 81, a memory 82, and a communication bus 83. The communication bus 83 is configured to implement connections and communications between the processor 81 and the memory 82. The processor 81 is configured to execute one or more computer programs stored in the memory 82 so as to perform steps of the method for determining a quasi co-location reference signal set according to embodiments of the present disclosure. Repetition is not made here.

Embodiments of the present disclosure further provide a computer-readable storage medium. The computer-readable storage medium includes a volatile or nonvolatile medium or a removable or non-removable medium implemented in any method or technology for storing information (such as computer-readable instructions, data structures, computer program modules, or other data). The computer-readable storage medium includes, and is not limited to, a random-access memory (RAM), a read-only memory (ROM), an electrically erasable programmable read-only memory (EE-PROM), a flash memory or other memory technologies, a compact disc read-only memory (CD-ROM), a digital versatile disc (DVD) or other optical disc storage, a magnetic cassette, a magnetic tape, a magnetic disk or other magnetic storage apparatuses, or any other medium that can be used for storing desired information and that can be accessed by a computer.

The computer-readable storage medium in embodiments of the present disclosure may be configured to store one or more computer programs executable by a processor to implement at least one step of the method for determining a quasi co-location reference signal set in embodiments of the present disclosure.

Embodiments of the present disclosure further provides a computer program (or computer software) which may be distributed on a computer-readable medium and executed by a computing apparatus to implement at least one step of the method for determining a quasi co-location reference signal set in embodiments of the present disclosure.

This embodiment further provides a computer program product. The computer program product includes a computer-readable apparatus. The preceding computer program is stored on the computer-readable apparatus. The computer-readable apparatus in this embodiment may include the preceding computer-readable storage medium.

It can be seen that it is to be understood by those skilled in the art that some or all steps of the preceding method and function modules/units in the preceding system or apparatus may be implemented as software (which may be implemented by computer program codes executable by a computing apparatus), firmware, hardware, and suitable combinations thereof. In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a central processing unit, a digital signal processor, or a microprocessor, may be implemented as hardware, or may be implemented as integrated circuits such as application-specific integrated circuits.

Additionally, as is known to those having ordinary skill in the art, communication media generally include computer-readable instructions, data structures, computer program modules, or other data in carriers or in modulated data signals transported in other transport mechanisms and may include any information delivery medium. Therefore, the present disclosure is not limited to any particular combination of hardware and software.

The above is a more detailed description of embodiments of the present disclosure in conjunction with implementations and is not to be construed as limiting embodiments of the present disclosure. For those having ordinary skill in the art to which the present disclosure pertains, simple deductions or substitutions may be made without departing from the concept of the present disclosure and are considered to fall within the scope of the present disclosure.

What is claimed is:

1. A method for signal communication, implemented by a communication node, comprising:
   determining first information according to signaling information and a predetermined rule;
   determining, according to the first information, a quasi co-location reference signal set of a port group comprised in a signal; and
   communicating the signal according to the determined quasi co-location reference signal set of the port group comprised in the signal, wherein the communicating comprises receiving or transmitting,
   wherein the first information comprises: a time interval between the signal and a control channel for scheduling the signal, a number of quasi co-location reference signal sets of a control channel element, a number of quasi co-location reference signal sets of the signal, and an index of one of the quasi co-location reference signal sets of the control channel element; and
   wherein the time interval between the signal and the control channel for scheduling the signal is less than a predetermined threshold.

2. The method of claim 1, comprising:
   acquiring the quasi co-location reference signal set of the port group of the signal, according to one or more quasi co-location reference signal sets of the control channel element satisfying a second predetermined characteristic in a first time unit, wherein the first time unit is closest to the signal, and the first time unit comprises a control channel element satisfying a first predetermined characteristic;
   wherein the control channel element satisfying the first predetermined characteristic comprises:
      the control channel element belonging to a control channel element group that corresponds to the signal;
      the control channel element locating at a frequency domain bandwidth index that corresponds to a frequency domain bandwidth index at which the signal is located; and
   wherein the control channel element is a CORESET.

3. The method of claim 1, wherein determining, according to the first information, the quasi co-location reference signal set of the port group comprises:
   determining quasi co-location reference signal sets of c port groups of the signal according to d quasi co-location reference signal sets of the control channel element,
   wherein in a case where a first condition is satisfied, determining a correspondence between the c port groups of the signal and the d quasi co-location reference signal sets of the control channel element according to the signaling information and the predetermined rule, wherein the first condition comprises d is greater than 1 and c is an integer.

4. The method of claim 1, wherein a quasi co-location reference signal set of the signal satisfies following characteristics:
   one port group of the signal is associated with g quasi co-location reference signal sets on f quasi co-location resource groups, wherein f is a positive integer greater than 1, g is a positive integer equal to f, and the one port group is associated with one of the g quasi co-location reference signal sets on each of the f quasi co-location resource groups,
   wherein each of the f quasi co-location resource groups is a frequency domain resource group, the f quasi co-location resource groups belong to the signal, and the quasi co-location reference signal sets of the one port group comprises the g quasi co-location reference signal sets.

5. The method of claim 1, wherein the port group satisfies the following characteristics:
   ports in the port group satisfy a quasi co-location relationship with respect to quasi co-location parameters of a type;
   ports in different port groups do not satisfy a quasi co-location relationship with respect to the quasi co-location parameters of the same type;
   the port group corresponds to one or more quasi co-location reference signal sets;
   the port group is associated with one or more quasi co-location reference signal sets on one time-frequency resource; or
   the port group is at least one of the following port groups: a port group of demodulation reference signal, a port group of measurement reference signal, a port group of phase tracking reference signal, or a port group of synchronization signal.

6. The method of claim 1, wherein the control channel element comprises one of the following:
   one control channel resource set (CORESET); or
   one candidate control channel.

7. The method of claim 4, wherein the f quasi co-location resource groups satisfy the following characteristics:
   one demodulation reference signal port corresponds to one of the g quasi co-location reference signal set in each of the f quasi co-location resource groups;
   one demodulation reference signal port in different quasi co-location resource groups does not satisfy a quasi co-location relationship with respect to quasi co-location parameters of a type;
   one of the f quasi co-location resource groups comprises k precoding resource groups, wherein k is a positive integer greater than or equal to 1;
   a boundary of each of the f quasi co-location resource groups coincides with a boundary of the k precoding resource groups, wherein the boundary comprises a frequency domain boundary;
   a resource in one precoding resource group does not belong to more than one of the f quasi co-location resource groups;
   A quasi co-location resource groups are associated with A quasi co-location reference signal sets, and each of the A quasi co-location resource groups is associated with one of the A quasi co-location reference signal sets; and
   wherein the signal comprises a demodulation reference signal received on the one demodulation reference signal port.

8. The method of claim 1, wherein:
in a case where a control channel for scheduling the signal is repeatedly transmitted in more than one control channel element, the time interval is a time interval between a last time domain symbol occupied by the more than one control channel element and the signal.

9. A communication node, comprising: a processor, a memory, and a communication bus, wherein:
the communication bus is configured to implement connections and communications between the processor and the memory; and
the processor is configured to execute one or more computer programs stored in the memory to perform:
determining first information according to signaling information and a predetermined rule;
determining, according to the first information, a quasi co-location reference signal set of a port group comprised in a signal; and
communicating the signal according to the determined quasi co-location reference signal set of the port group comprised in the signal, wherein the communicating comprises receiving or transmitting,
wherein the first information comprises: a time interval between the signal and a control channel for scheduling the signal, a number of quasi co-location reference signal sets of a control channel element, a number of quasi co-location reference signal sets of the signal, and an index of one of the quasi co-location reference signal sets of the control channel element; and
wherein the time interval between the signal and the control channel for scheduling the signal is less than a predetermined threshold.

10. The communication node of claim 9, wherein the processor is configured to execute the one or more computer programs stored in the memory to perform:
acquiring the quasi co-location reference signal set of the port group of the signal, according to one or more quasi co-location reference signal sets of a control channel element satisfying a second predetermined characteristic in a first time unit, wherein the first time unit is closest to the signal, and the first time unit comprises a control channel element satisfying a first predetermined characteristic;
wherein the control channel element satisfying the first predetermined characteristic comprises:
the control channel element belonging to a control channel element group that corresponds to the signal;
the control channel element locating at a frequency domain bandwidth index that corresponds to a frequency domain bandwidth index at which the signal is located; and
wherein the control channel element is a CORESET.

11. The communication node of claim 9, wherein determining, according to the first information, the quasi co-location reference signal set of the port group comprises:
determining quasi co-location reference signal sets of c port groups of the signal according to d quasi co-location reference signal sets of the control channel element,
wherein in a case where a first condition is satisfied, determining a correspondence between the c port groups of the signal and the d quasi co-location reference signal sets of the control channel element according to the signaling information and the predetermined rule, wherein the first condition comprises d is greater than 1 and c is an integer.

12. The communication node of claim 9, wherein a quasi co-location reference signal set of the signal satisfies following characteristics:
one port group of the signal is associated with g quasi co-location reference signal sets on f quasi co-location resource groups, wherein f is a positive integer greater than 1, g is a positive integer equal to f, and the one port group is associated with one of the g quasi co-location reference signal sets on each of the f quasi co-location resource groups,
wherein each of the f quasi co-location resource groups is a frequency domain resource group, the f quasi co-location resource groups belong to the signal, and the quasi co-location reference signal sets of the one port group comprises the g quasi co-location reference signal sets.

13. The communication node of claim 9, wherein the port group satisfies the following characteristics:
ports in the port group satisfy a quasi co-location relationship with respect to quasi co-location parameters of a type;
ports in different port groups do not satisfy a quasi co-location relationship with respect to the quasi co-location parameters of the same type;
the port group corresponds to one or more quasi co-location reference signal sets;
the port group is associated with one or more quasi co-location reference signal sets on one time-frequency resource; or
the port group is at least one of the following port groups: a port group of demodulation reference signal, a port group of measurement reference signal, a port group of phase tracking reference signal, or a port group of synchronization signal.

14. The communication node of claim 9, wherein the control channel element comprises one of the following:
one control channel resource set (CORESET); or
one candidate control channel.

15. The communication node of claim 12, wherein the f quasi co-location resource groups satisfy the following characteristics:
one demodulation reference signal port corresponds to one of the g quasi co-location reference signal sets in each of the f quasi co-location resource groups;
one demodulation reference signal port in different quasi co-location resource groups does not satisfy a quasi co-location relationship with respect to quasi co-location parameters of a type;
one of the f quasi co-location resource groups comprises k precoding resource groups, wherein k is a positive integer greater than or equal to 1;
a boundary of each of the f quasi co-location resource groups coincides with a boundary of the k precoding resource groups, wherein the boundary comprises a frequency domain boundary;
a resource in one precoding resource group does not belong to more than one of the f quasi co-location resource groups;
A quasi co-location resource groups are associated with A quasi co-location reference signal sets, and each of the A quasi co-location resource groups is associated with one of the A quasi co-location reference signal sets; and
wherein the signal comprises a demodulation reference signal received on the one demodulation reference signal port.

16. The communication node of claim 9, wherein:
in a case where a control channel for scheduling the signal is repeatedly transmitted in more than one control channel element, the time interval is a time interval between a last time domain symbol occupied by the more than one control channel element and the signal.

17. A non-transitory computer-readable storage medium comprising instructions, wherein the instructions, when executed by a processor, is configured for performing:
determining first information according to signaling information and a predetermined rule;
determining, according to the first information, a quasi co-location reference signal set of a port group comprised in a signal; and
communicating the signal according to the determined quasi co-location reference signal set of the port group comprised in the signal, wherein the communicating comprises receiving or transmitting,
wherein the first information comprises: a time interval between the signal and a control channel for scheduling the signal, a number of quasi co-location reference signal sets of a control channel element, a number of quasi co-location reference signal sets of the signal, and an index of one of the quasi co-location reference signal sets of the control channel element; and
wherein the time interval between the signal and the control channel for scheduling the signal is less than a predetermined threshold.

18. The non-transitory computer-readable storage medium of claim 17, wherein the instructions, when executed by the processor, is configured for performing:
acquiring the quasi co-location reference signal set of the port group of the signal, according to one or more quasi co-location reference signal sets of the control channel element satisfying a second predetermined characteristic in a first time unit, wherein the first time unit is closest to the signal, and the first time unit comprises a control channel element satisfying a first predetermined characteristic;
wherein the control channel element satisfying the first predetermined characteristic comprises:
the control channel element belonging to a control channel element group that corresponds to the signal;
the control channel element locating at a frequency domain bandwidth index that corresponds to a frequency domain bandwidth index at which the signal is located; and
wherein the control channel element is a CORESET.

19. The non-transitory computer-readable storage medium of claim 17, wherein determining, according to the first information, the quasi co-location reference signal set of the port group comprises:
determining quasi co-location reference signal sets of c port groups of the signal according to d quasi co-location reference signal sets of the control channel element,
wherein in a case where a first condition is satisfied, determining a correspondence between the c port groups of the signal and the d quasi co-location reference signal sets of the control channel element according to the signaling information and the predetermined rule, wherein the first condition comprises d is greater than 1 and c is an integer.

20. The non-transitory computer-readable storage medium of claim 17, wherein a quasi co-location reference signal set of the signal satisfies following characteristics:
one port group of the signal is associated with g quasi co-location reference signal sets on f quasi co-location resource groups, wherein f is a positive integer greater than 1, g is a positive integer equal to f, and the one port group is associated with one of the g quasi co-location reference signal sets on each of the f quasi co-location resource groups,
wherein each of the f quasi co-location resource groups is a frequency domain resource group, the f quasi co-location resource groups belong to the signal, and the quasi co-location reference signal sets of the one port group comprises the g quasi co-location reference signal sets.

\* \* \* \* \*